Oct. 23, 1928.

J. FISCHER

PRICE SCALE

Filed Aug. 13, 1925

Inventor
Johannes Fischer

Oct. 23, 1928.

J. FISCHER

PRICE SCALE

Filed Aug. 13, 1925    10 Sheets-Sheet 2

Fig. 4.

Inventor
Johannes Fischer
By King Goghorn

J. FISCHER

PRICE SCALE

Filed Aug. 13, 1925

Inventor
Johannes Fischer

J. FISCHER 1,688,539

PRICE SCALE

Filed Aug. 13, 1925   10 Sheets-Sheet 6

Oct. 23, 1928. 1,688,539
J. FISCHER
PRICE SCALE
Filed Aug. 13, 1925    10 Sheets-Sheet 8

Inventor
Johannes Fischer

Oct. 23, 1928.

J. FISCHER

1,688,539

PRICE SCALE

Filed Aug. 13, 1925

Patented Oct. 23, 1928.

1,688,539

UNITED STATES PATENT OFFICE.

JOHANNES FISCHER, OF COLOGNE-HOLWEIDE, GERMANY.

PRICE SCALE.

Application filed August 13, 1925, Serial No. 49,956, and in Germany October 24, 1924.

The invention relates to an automatic balance fitted with a device for establishing the price of the matter weighed. There are known automatic balances with a device for establishing the price of the matter weighed on the ground of the weight and a set base price, in which the values of the weight of the matter made out by the weighing is bodily represented by a cam formed in the nature of a worm. These balances have the drawback that they contain only comparatively few values of the bodily represented weights useful for the calculation of the price of the matter weighed, unless the cam is made excessively large, because two neighbouring values must lie relatively far apart on the cam if the difference of their distances from the axis of rotation should be considerable. For, only in this case, the result counting mechanism, which is shiftable on a slide, can indicate the second product.

This drawback is avoided according to the invention by representing the values of the weights of goods displayed by the indicating device of the balance, individually and bodily by determining units (elevations or depressions) on a member which is in operative connection with the indicating device.

The new device may be provided with a counting mechanism adapted to sum up the individual amounts calculated in the course of a day or the like and to display the sum obtained.

With these and incidental objects in view, the invention consists in certain novel features of construction and combinations of parts, the essential elements of which are set forth in appended claims, and a preferred form of embodiment of which is hereinafter described with reference to the drawings which accompany and form part of this specification.

Figure 1:
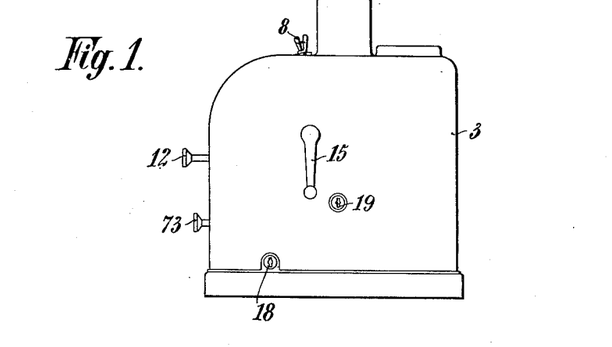
Fig. 1 is a side elevation of the balance.
Figure 2:
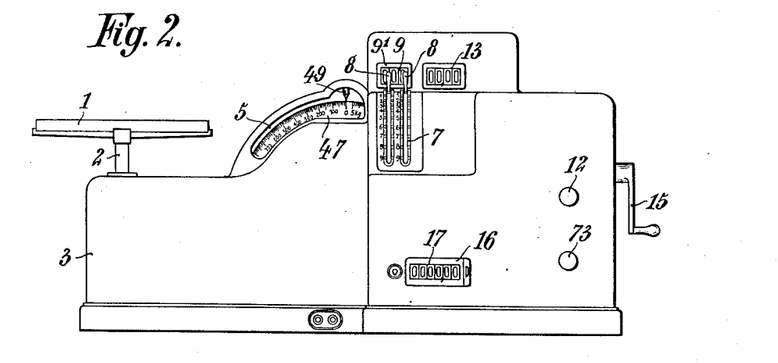
Fig. 2 is an elevation seen from the seller's side.
Figure 3:
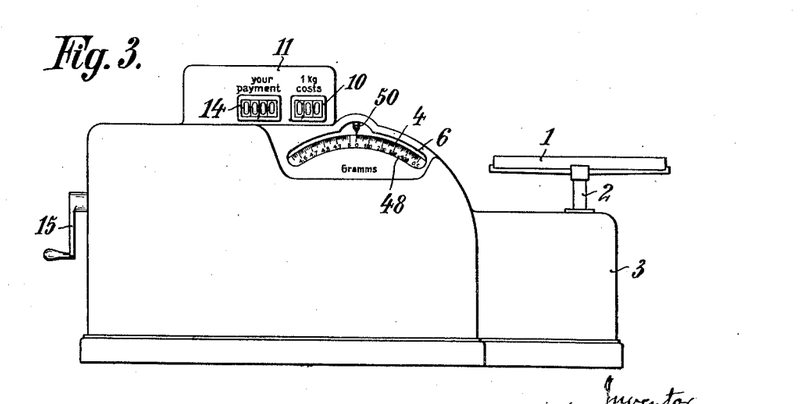
Fig. 3 is an elevation seen from the purchaser's side.

As is to be seen from Figs. 1 to 3, the device used for establishing the weight of the matter to be sold consists of a balance the pan 1 of which together with its supporting stem 2 project out of a cabinet 3. The weight of the matter placed on this pan 1 is indicated by two rotatable weight scales 4 which are visible through an inspection hole 5 from the seller's side, Fig. 2, and through an inspection hole 6 from the purchaser's side, Fig. 3. Arranged in slots 7 of the cabinet 3, Fig. 2, are two setting levers 8 by means of which the price per kilogram of the matter to be sold may be manually set in the calculation mechanism which is mounted in the cabinet 3. The adjustment of these levers 8 may be read on the seller's side from the indicating mechanism 9, Fig. 2, above those levers, while the purchaser may gather the set price per kilogram from the inspection hole 10, Fig. 3, which is arranged below a sign-plate 11 showing a corresponding direction.

The product representing the actual price of purchase of the matter weighed and obtained by a multiplication of the set price per kilogram and the weight to be made out by the balance is established by operating the calculating mechanism of the balance and is indicated in inspection holes 13 on the seller's side, Fig. 2, and in inspection holes 14 on the purchaser's side, Fig. 3.

The operation of the calculating mechanism is either effected by means of an electromotor placed in the cabinet or, as shown, by a hand crank 15 which is arranged on the right-hand side of the cabinet 3, Fig. 2. The cabinet 3 shows on the seller's side of the balance a push button 12 which has to be depressed before each rotation of the hand crank 15 in order to release the drive which is locked in the initial position.

On the seller's side of the cabinet 3 there is made visible through an inspection hole 16 by means of indicating segments 17 the result of an adding mechanism which continuously sums up the selling prices indicated in the inspection holes 13 and 14, so that, for instance, the total sum of a day or the like may be read through the said inspection hole 16. The indicating segments 17 may be returned to zero by means of a key to be inserted into a key-hole 18 on one of the head sides of the cabinet 3, Fig. 1. The adding mechanism is set for zero by means of a key to be introduced into the key-hole 19.

A key 73 on the seller's side of the cabinet 3 of the balance has to be depressed if the selling sum of a weighing should not be indicated but summed up with the next or further weighings, this being especially desirable if a purchaser buys at the same time a plurality of different goods.

Figure 4:
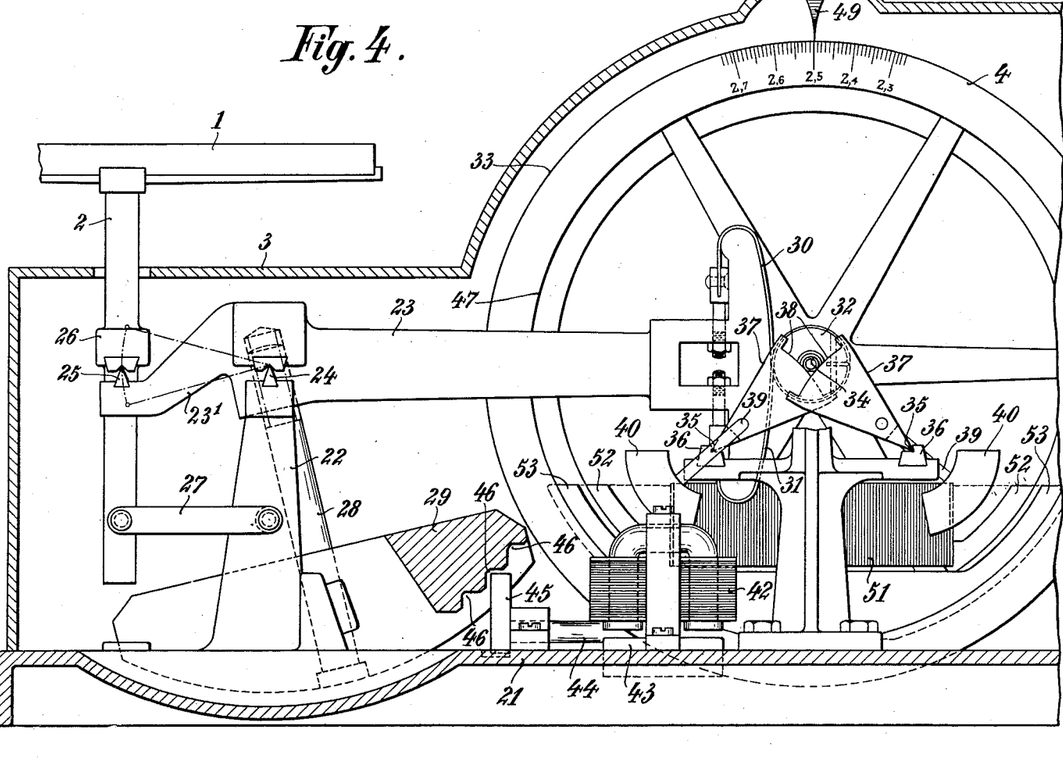
Fig. 4 is a partial longitudinal section through the balance.

The base plate 21, Fig. 4, of the balance carries a standard 22 which has rotatably mounted on knife edges 24 a beam 23. The short ends 23¹ of the beam which are directed towards the left, carry by means of knife-edges 25 the supporting stem 2 with the pan 1. The stem 2 is connected with a cross-head 26 and extends beyond the cabinet 3. The stem 2 is guided linearly by means of a link 27 which is pivoted to the lower end of the stem 2 and to the standard 22. Connected with the beam 23 by means of two downwardly extending rods 28 is a counter weight 29 constituting with the beam and the goods carrier an inclination balance.

Figure 5:
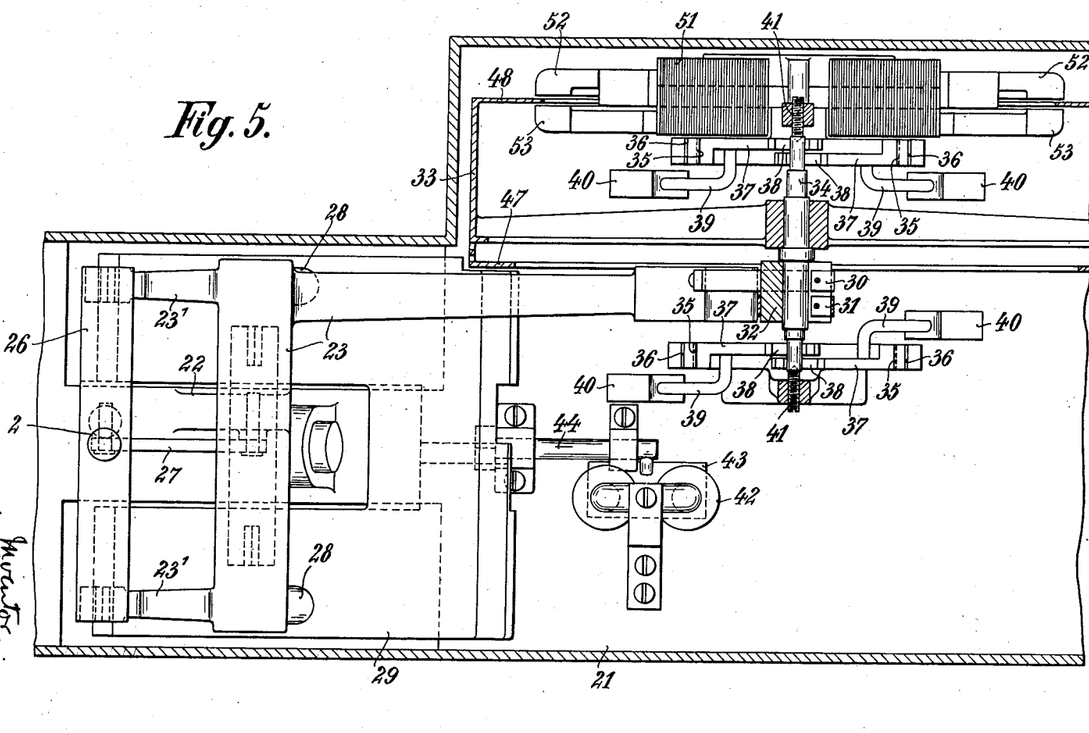
Fig. 5 is a sectional plan of the balance.

The deflections of this inclination balance are transmitted from the right-hand arm of the beam 23 to a rotatably mounted drum 33 having two weight scales 4 by means of steel bands 30, 31, which are fastened to the beam 23 and to a roll 32 which is fixed on the shaft 34 of the drum 33, the bands being passed around the upper and lower half circumference, respectively, of the roll 32, Figs. 4 and 5. During the swinging movements of the beam 23, the steel bands 30, 31 impart rotation to the drum 33 inasmuch as one band winds upon the roll 32 while the other band simultaneously unwinds from the same. For the purpose of obtaining an easy rotatability of the scale drum 33, the shaft 34 of the drum 33 passing through the roll 32 rests at each side on two single-armed levers 37 which are supported by means of a knife-edge 35 on a corresponding seat 36. The hardened and well ground rolling faces 38 of the levers 37 which bear against the shaft 34, are curved around the tips of the knife-edges 35. Each single-armed lever 37 carries by means of an arm 39 a balance weight 40. During the rotation of the drum shaft 34 the levers 37 are rocked about their knife-edges 35 while the shaft 34 rolls off on the rolling faces 38.

In order to prevent the shaft 34 of drum 33 from being lifted from the rolling faces 38, shaft 34 is held by two dead centres 41 which are inserted loosely so that they do not interfere with the rotation of shaft 34 by friction.

The drum 33, which is rotated by the balance, has two inwardly directed edges 47 and 48, Fig. 5, which are provided with the weight indicating scales 4 which are visible to the seller and to the purchaser. These scales extend on the edges 47 and 48 in opposite directions so that, with one and the same direction of rotation of the drum 33, the same weight may always be read with relation to the stationary pointers 49 and 50, Figs. 2 and 3, from both sides.

The rotary to and fro movements of the drum 33 which are produced by placing a matter on the balance pan, are damped by an electric eddy-current brake 51 through which flows a closed circuit current. The magnet cores 52 and 53 of this eddy-current brake are arranged so that the magnetic lines of force traverse the inwardly directed drum edge 48 which is made of aluminium sheet; the drum 33 executing rotary to and fro movements will thus be brought quickly to a standstill.

Figure 6:
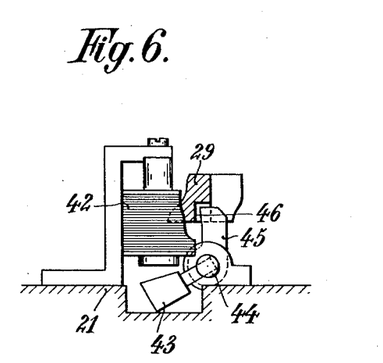
Fig. 6 is a locking device which prevents the balance pan from moving as long as the weight scale of the balance is not under the influence of a brake.

The base plate 21 of the balance has fastened on it an electromagnet 42, Figs. 4, 5 and 6, opposite of which is arranged an armature 43. This armature 43 is fastened to one end of a rotary shaft 44 which carries at its other end an arm 45. The lower side of the counter weight 29 is provided with three notches 46 which are engaged by the arm 45 when the armature 43 is not attracted by the electromagnet 42.

The electric closed circuit flowing through the eddy-current brake 51 is also passed through the winding of the electromagnet 42 so that the latter is adapted to attract the armature 43 and hold the locking arm 45 outside the notches 46 of the counter weight 29 as long as the closed circuit current is flowing. If this electric current fails the armature drops and the locking arm 45 engages the notch 46 so as to prevent the balance from being used. This locking mechanism 45, 46 is necessary because injuries to the sensitive mounting of drum 33 may easily be entailed by using the scale incautiously without the action of the brake 51. If the electric closed circuit current flows through the windings of brake 51 and electromagnet 42, the locking mechanism 45 is again released and the balance may again be used without entailing injuries, because the brake is always fully operative and prevents too rapid rotations of the scale drum.

The values indicated by the scale drum 33 are bodily represented by elevations formed on the shell surface of this drum. As each value may be united with its succeeding and its preceding value, the shell surface of drum 33 is provided with ledges 54, 55 and 56 which are arranged beside one another in accordance with the weights indicated by the balance.

For 9 times 10 grams each of the weight indicated by the drum 33, the latter has fastened on its shell surface the inclined ledges 54 following each other in definite distances. The hundreds (9 times 100 grams) are represented each by a ledge 55 which extends in the middle of the shell surface parallel to the margin of the drum. For the kilogram amounts there are provided ledges 56 extending in the same direction as the ledges 55. As the maximum weight to be indicated by the balance is supposed to be 5 kilograms, there is still provided beyond the place of the value of 4.99 kilograms which is last but one, an individual pin 57 representing the value of 5 kilograms. The series of the bodily represented values begins on the shell surface of drum 33 at $54^1$ with the lowest initial weight value of 10 grams.

The values bodily represented on drum 33 effect the setting of a calculating mechanism. To this end, there is arranged between the calculating mechanism, shown in Figs. 9 and 10 in a longitudinal and transverse section, and the elevations on drum 33 a transfer device the details of which may also be gathered from the Figs. 7 and 8.

Arranged on the base plate 21 of the balance parallel of the rotary shaft 34 of the drum 33 is a shaft 58 which carries a bell crank lever 59. This lever 59 has a head 60 possessing a length corresponding to the breadth of the space occupied by the bodily represented values on the shell surface of the drum. Fastened in the said head are the ends of a number of flexible tubes 61 which may consist of helically wound wires. The other ends of these tubes 61 are arranged in a stationary segment 62, Fig. 10. The tubes 61 contain in their interior spring-pressed steel wires 63 which extend beyond the tubes 61 opposite to the shell surface of drum 33. The bell crank lever 59 is connected with the drive of the calculating mechanism of the balance in such a manner that it is rocked with its head 60 in the direction of the arrow $x$, indicated in Fig. 8, at the beginning of the operation of the calculating mechanism. The ends of the wires 63 are then moved toward the shell surface of the drum and parts of the ledges 54, 55 and 56 hold back those wires 63 which transfer the value corresponding to the weight made out. By holding back a wire with relation to the forwardly moved lever head 60 the wire is shifted longitudinally in the tube 61. The other ends of the wires 63 serving to transmit the value are thereby caused to strike on pins 64 which are mounted for shifting motion in the segment 62 and placed under the action of springs $64^1$. The segment 62 contains two rows of nine pins 64 each for the tens and the hundreds of the unit of weight and a row of five pins for the thousands. A rotatably mounted bell 65, see Figs. 9 and 10, carries driving teeth 66 corresponding to the pins 64 and shiftable axially with relation to the bell. Each driving tooth 66 has an oblique face 67 on the side directed toward the pins 64 and on the opposite side a toe 68 projecting into the interior of the bell 65.

Figure 10:
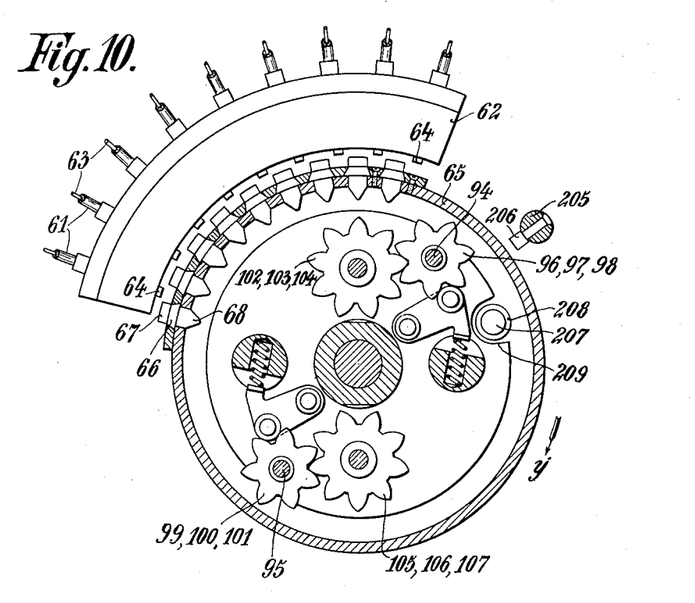
Fig. 10 is a cross section of Fig. 9 along the line 10—10.

If one of the pins 64, f. i. the eighth from the left in Fig. 10, is caused to project beyond the guide in the segment 62 towards the axis of the bell 65 by the corresponding wire 63 being shifted and the bell 65 is thereupon rotated in the direction of the arrow $y$, indicated in Fig. 10, by the actuation of the calculating mechanism, eight toes 68, beginning from the left, will be sucessively moved laterally into their operative position. In this manner, the weight established by the automatic balance is set in a calculating mechanism.

If the matter placed on the pan 1 of the balance has a weight which is not divisible by 10, the transmission wires 63 will assume with relation to the bodily represented weights on the shell surface of drum 33 intermediate positions which might entail inaccurate or double adjustments and therefore should be avoided. The weight of the matter must therefore be rounded off upwards or downwards to 10 grams full.

The device serving this purpose is hereinafter described.

Mounted for rotation on the shaft 58 of the bell-crank lever 59 carrying the projecting wire ends 63, are two feelers 70 provided with wedge-shaped tips 69 the knife-edges of which are arranged opposite to two rows of holes 71, 72 in the shell surface of drum 33. The holes 71, 72 of these rows are staggered with relation to one another in such a manner that the bridge between two holes each of one row is situated beside a hole of the other row. The centre of each hole corresponds to an exact value-position of the drum divisible by 10. When the bell crank lever 59 is rocked in the direction of the arrow $x$, the two feelers 70 are also moved forward and their knife-edges 69 caused to strike against the drum 33. One of the wedge-shaped knife-edges 69 will enter into a hole 71 and 72 of the drum surface and accurately set the drum 33 in a definite value-position divisible by 10, so that a correct and accurate transmission of the factor of weight to the calculating mechanism is attained. The other feeler 70, the knife-edge 69 of which does not enter into a hole of the drum circumference, will remain behind.

The feelers 70 are preferably controlled through the intermediary of springs by means of cams which revolve during the operation of the calculating mechanism.

Figure 12:
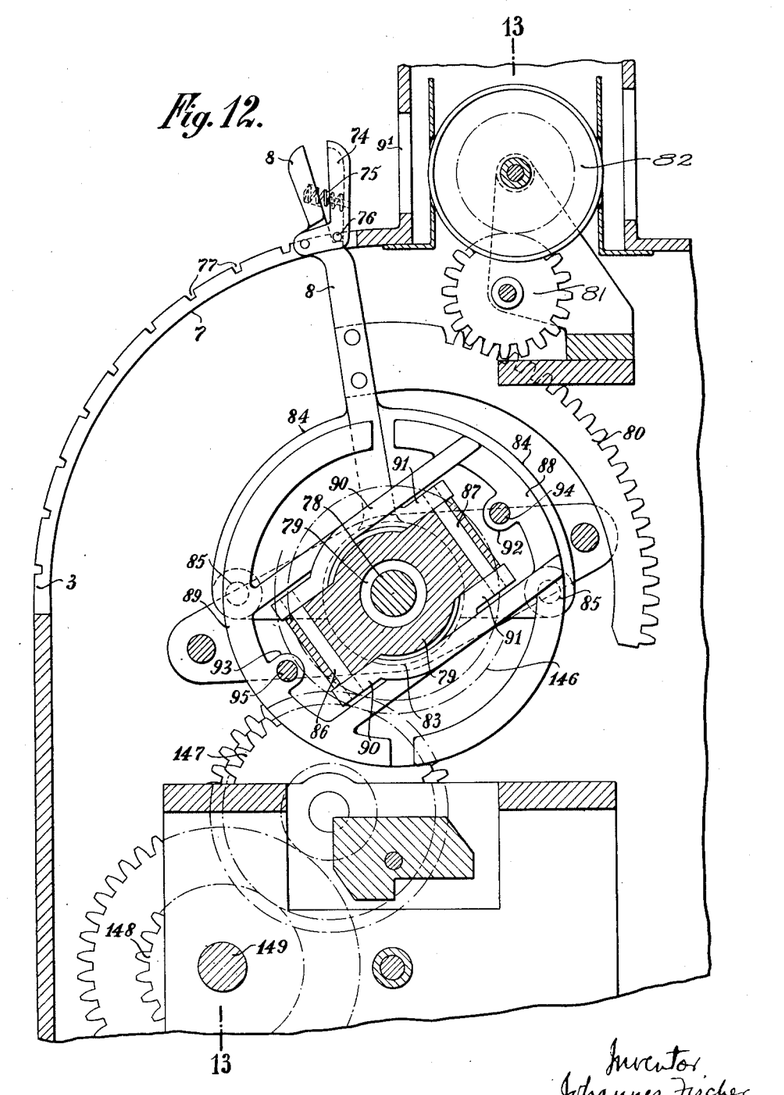
Fig. 12 is a cross section of the setting mechanism along the line 12—12 of Fig. 13.

As shown in Fig. 12, the setting levers 8 which are movable in slots 7 and designed to introduce the price per kilogram of the merchandise in the calculating mechanism, are provided each with a hand pawl 74 placed under the action of a spring 75 and having a laterally projecting locking pin 76 adapted to engage notches 77 of the machine casing 3, corresponding to the ten different positions of value, and to lock thereby the setting levers 8 in their adjusted position. The setting levers 8 which are mounted for rotation around a stationary sleeve 79, are provided with toothed segments 80 which are designed to rotate indicating wheels 9 by means of intermediate wheels 81. These wheels 9 indicate the value, introduced by means of the setting lever 8, in the inspection hole $9^1$ above the setting lever on the seller's side, Fig. 2. In order to allow the same value to be displayed in the same arrangement in the inspection hole 10 on the purchaser's side, Fig. 3, the indicating wheels 9 are connected with indicating wheels 82, Fig. 13, in such a manner that the left-hand indicating wheel 9 is connected with the right-hand indicating wheel 82 and that the right-hand indicating wheel 9 is connected with the left-hand indicating wheel 82 by means of nested shafts. The zero of the units of both indicating devices is fixed because the construction is based on that it is only reckoned with prices of kilograms which differ from each other by ten pennies full. The same arrangement is also made in the result indicating mechanisms 13 and 14.

Connected with the hubs 83 of the setting levers 8 are sectors 84, Fig. 12, in each of which is arranged a bolt 85 which is easily shiftable in axial direction and of a length somewhat greater than the breadth of the sectors 84. The sector 84 of one setting lever 8 extends forwardly and that of the other rearwardly. Inserted in the stationary sleeve 79 are two spindles 86 and 87, Fig. 12, on which two curved members 88 and 89 attached to arms 90 and 91 are mounted for rocking motion in axial direction with relation to the main shaft 78. These curved members 88, 89 are provided with lugs 92, 93 against which bear two shafts 94, 95 which are shiftably mounted in stationary parts and placed under the action of springs $96^1$.

Arranged loosely on each of these shafts 94, 95 are three pinions 96, 97, 98 and 99, 100, 101. The pinions 96, 97, 98 mesh with pinions 102, 103, 104, while the pinions 99, 100, 101 are in mesh with pinions 105, 106, 107. The pinion 104 is fastened on a shaft 108 on which is also fastened a pinion 109. Mounted for rotation on this shaft 108 is a sleeve 110 which carries at one end the pinion 103 and at the other end a pinion 111. The sleeve 110 is surrounded by another sleeve $110^1$ with which are connected the pinions 102 and 112. The pinions 105, 106, 107 are connected in a similar manner through the intermediary of the shaft 113 and sleeves 114, 115 with pinions 116, 117, 118.

Arranged on shaft 108 beside the pinion 109 is still a freely rotatable pinion 119, while the shaft 113 has mounted on it beside the wheel 116 two other pinions 120 and 121. These wheels 120 and 121 serve to transfer the tens to the result mechanism. The latter consists of five pinions 122, 123, 124, 125, 126 which are freely rotatable on the main shaft 78. The pinions 118, 117, 116 are in constant engagement with the wheels 122, 123 and 124 for the units, tens and hundreds of the result mechanism, while the wheels 112, 111 and 109 mesh with the wheels 123, 124 and 125 for the tens, hundreds and thousands.

Figure 16:
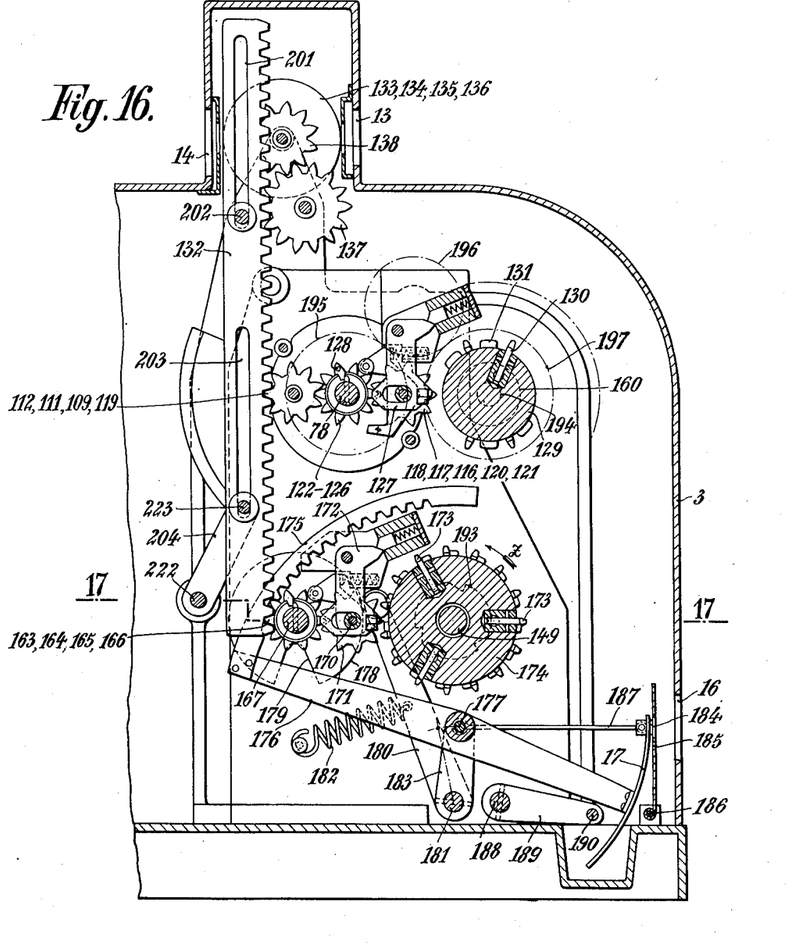
Fig. 16 is a cross section through the calculating device with an adding mechanism according to the line 16—16 of Fig. 13.

For the purpose of transferring the tens in the result mechanism there are provided the well-known tens transfer levers 127 which are rocked into the operative position by means of tens transfer pins 128, Fig. 16, of the wheels of the result mechanism and which cause the tens transfer teeth 130, which are arranged and adapted to be rocked axially in a revolving tens transfer drum 129, to enter into engagement with a toothed wheel representing the next higher order of value. The tens transfer drum 129 is besides provided with cam members 131 which return the tens transfer levers 127 from their operative position into their initial inoperative position during the rotation of the drum 129 after the tens transfer has been terminated.

Figure 13:
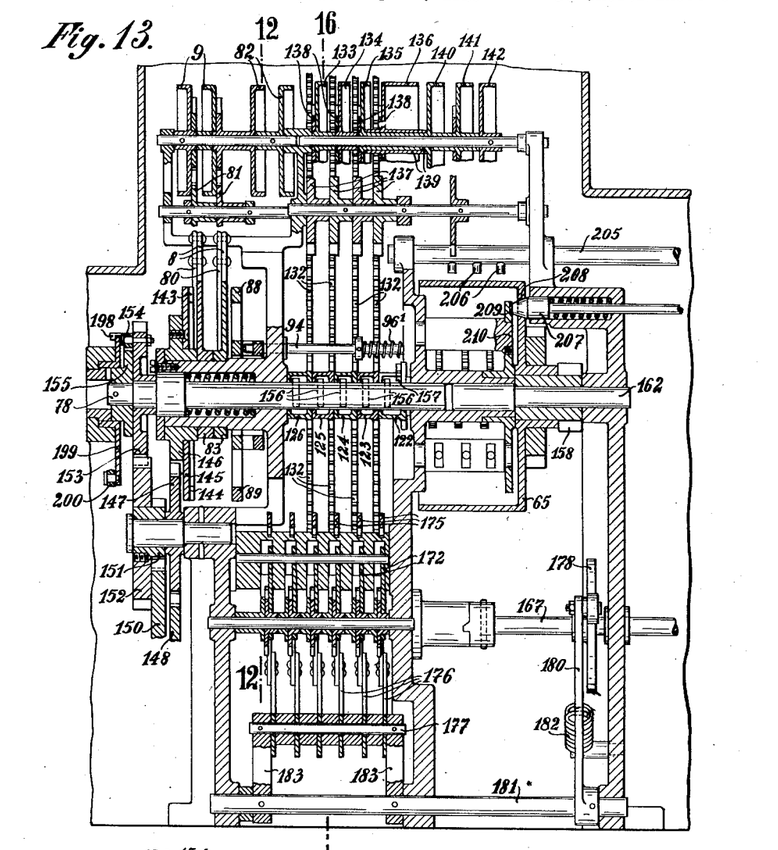
Fig. 13 is a longitudinal section through the setting mechanism and the result mechanism according to the line 13—13 of Fig. 12.

The product of a multiplication accumulated in the wheels of the result mechanism is adapted to be indicated, when this mechanism is zeroized, in the hole 13 on the seller's side of the balance by means of rack bars 132, Figs. 13 and 16, in a result indicating mechanism consisting of the numeral disks 133, 134, 135, 136. The rack bars 132 are in engagement with intermediate wheels 137 which in their turn mesh with the driving wheels 138 of the numeral disks 133, 134, 135, 136. These several numeral disks are connected by nested shafts 139 and by an intermediate wheel, fastened on the shaft of the intermediate wheels 137, with numeral disks 140, 141, 142 in such a manner that the numerals provided on their periphery and rising in opposite directions can be read off correctly through the inspection hole 14 on the purchaser's side of the balance in accordance with the value indicated in the inspection hole 13. The numeral disk 136 is of double breadth and provided with two similar series of numerals rising in opposite direction. The left-hand half of this disk serves to indicate the units in the hole 14, while the right-hand half indicates the units in hole 13.

Figure 9:
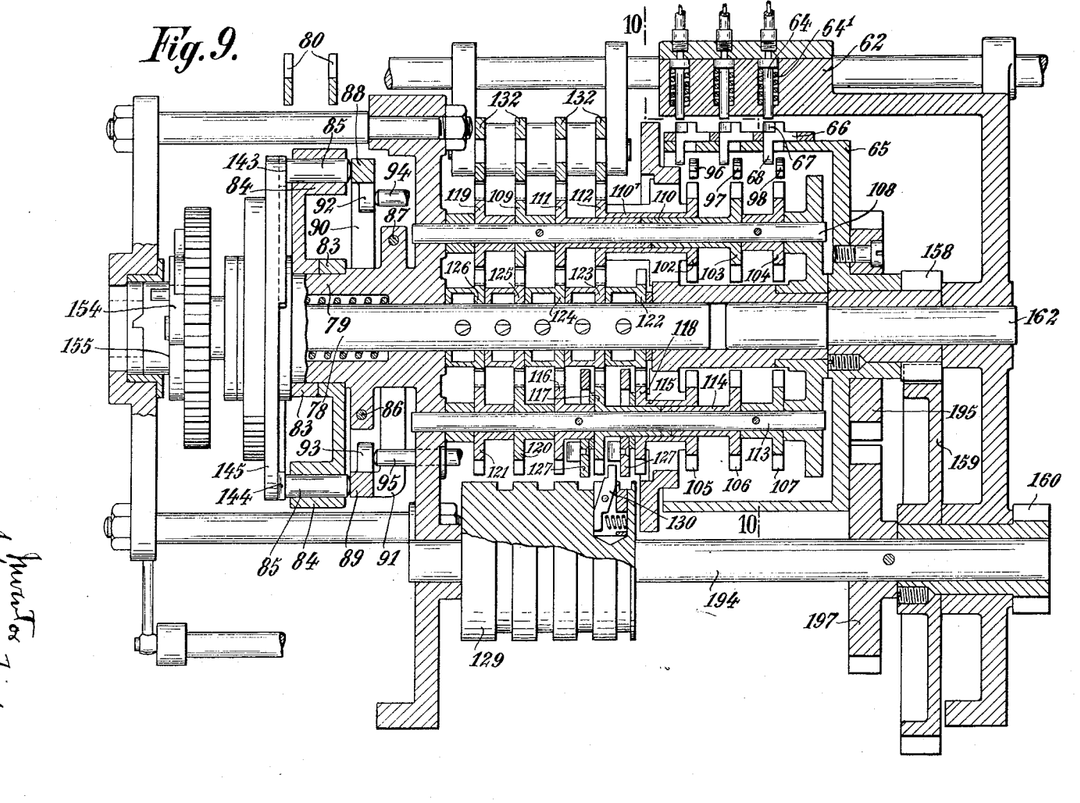
Fig. 9 is a longitudinal section through the calculating mechanism.
Figure 11:
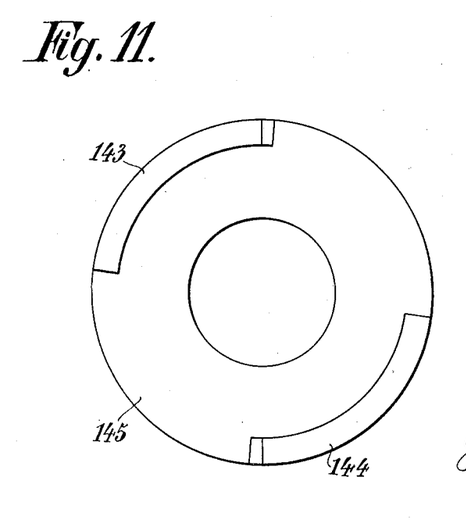
Fig. 11 is a part of the calculating mechanism of Fig. 9, seen from the side.

The shifting of the bolts 85, Fig. 9, mounted in the two sectors 84 of the setting levers 8 is effected by laterally projecting cam members 143 and 144 of a disk 145, Fig. 11, which produces, in accordance with the positioning of the setting levers 8 and during a rotation of about 90 degrees, a temporary lateral shifting movement (towards the right, Fig. 9) of the bolts 85 and consequently of the shafts 94, 95 which are under the action of the springs $96^1$ and carrying the driving pinions 96, 97, 98 and 99, 100, 101.

The disk 145 is driven from a shaft 149, Fig. 12, through the intermediary of a sectional toothed wheel 146, Fig. 13, and two toothed wheels 147, 148. The shaft 149 which has an oscillatory movement of about 120 degrees imparted to it by the drive of the balance, is besides in operative connection with the shaft 78 through the pinions 150, 151, 152, 153, a spring-pressed pawl 154 rotatably carried by the pinion 153 and a feed wheel 155.

Figure 14:
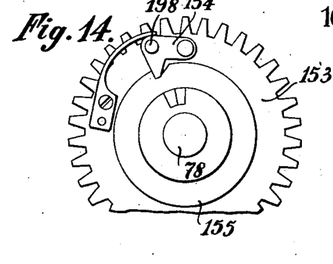
Fig. 14 shows a detail in side elevation.
Figure 15:
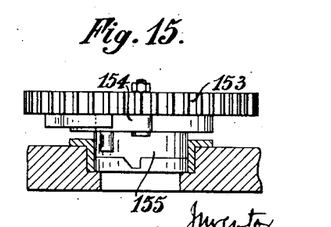
Fig. 15 shows this detail in plan.

During the forward rotation of the shaft 149 (direction of the arrow $z$ in Fig. 16) the disk 145 is rotated, while the shaft 78 is not carried along, because the pawl 154 moves out of the notch of the feed disk 155 and glides along the periphery without rotating this disk 155, Figs. 14 and 15. During the return rotation of the shaft 149 the disk 145 is returned to the initial position and at the same time a rotation of the shaft 78 is produced, since in this direction of rotation of the pinion 153 the spring-pressed pawl 154 is adapted to carry along with it the feed wheel 155. Fastened on the shaft 78 are zero-setting pins 156 which, upon this shaft rotating, return the pinions 122, 123, 124, 125, 126 of the result mechanism into the initial zero-position through the intermediary of driving pins 157. As stated above, this zero-setting of the result mechanism causes the product accumulated in this mechanism to be transmitted into the result indicating mechanisms 13, 14.

The driving teeth 68, Fig. 9, positioned within the bell 65 by the scale drum 33, lie in the plane of the pinions 96, 97, 98 and 99, 100, 101 mounted on the axially shiftable shafts 94, 95, when these pinions are not acted upon by the cam members 143, 144 of the disk 145. The shifting movement of the shafts 94, 95 toward the right, Fig. 9, produced by the disk 145 causes the pinions 96, 97, 98 and 99, 100, 101 to be brought out of the operative plane of the teeth 68.

Figure 17:
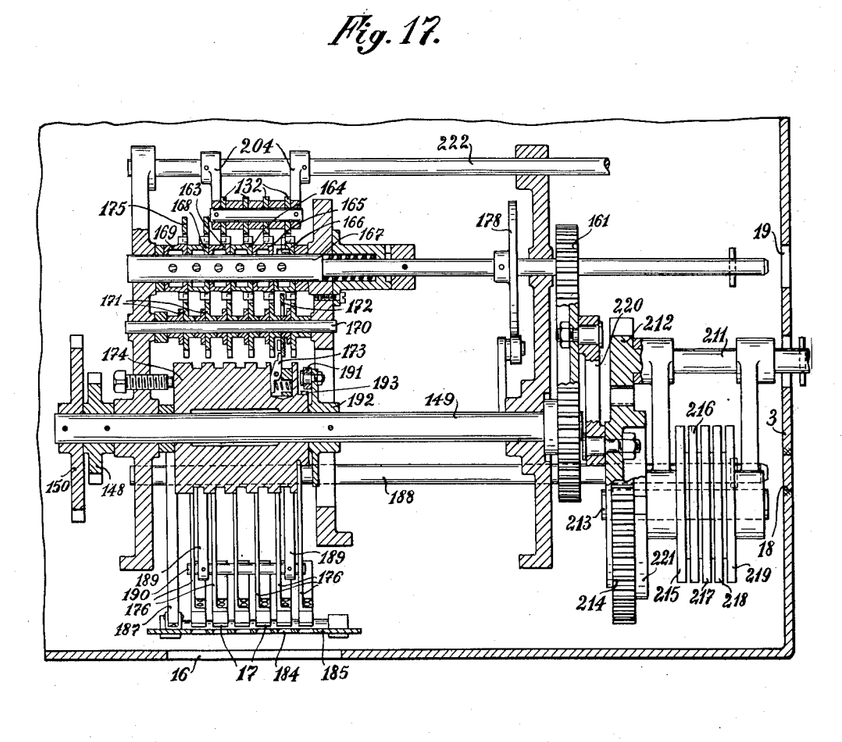
Fig. 17 is a section through the adding mechanism according to the line 17—17 of Fig. 16.

The bell 65 together with a pinion 158 is fixed on a shaft 162 to which rotation is imparted by a toothed segment 161, Fig. 17, through the intermediary of the toothed wheels 159, 160. The said toothed segment 161 is fastened on shaft 149. The toothed wheels 159, 160 are mounted for free rotation on a counter shaft 194 which carries the tens transfer drum 129 for the result mechanism. The shaft 194 is driven by shaft 162 of the bell 65 through the intermediary of three companion pinions 195, 196 and 197, Fig. 16.

The ratio of transmission between shaft 149 making a rotation of about 120 degrees and shaft 162 on the one hand and controlling disk 145 on the other hand is chosen so that the bell executes nine revolutions while the disk 145 rotates only by about 90 degrees in the same space of time.

The operation of the calculating mechanism will now be described by an example.

If the price of one kilogram of the merchandise is supposed to be 2,60 marks, the left-hand setting lever 8 is set on a "2" and the right-hand setting lever on a "6." If the scale drum indicates a weight of the merchandise of 3750 grams, there will be depressed in the order of the tens the fifth pin 64 from the left, Fig. 10, in the order of the hundreds the seventh and in the order of the thousands the third pin 64, after the transmitting devices 63 have entered into action. (The last zero is not taken into consideration the same as in the kilogram price.)

The result of the multiplication of $$375 \,.\, 26 = 9750$$

is made out in the calculating mechanism in the following manner:

```
1st revolution of the bell  375
                            375
2nd revolution of the bell  375
                            375
3rd revolution of the bell  . . .
                            375
4th revolution of the bell  . . .
                            375
5th revolution of the bell  . . .
                            375
6th revolution of the bell  . . .
                            375
7th revolution of the bell  . . .
                            . . .
8th revolution of the bell  . . .
                            . . .
9th revolution of the bell  . . .
                            . . .
                           ─────
                            9750
```

During the first revolution of the bell 65 in the direction of the arrow $y$, Fig. 10, there are first brought into operative position by being moved laterally five driving teeth 68 in the order of the tens, seven in the order of the hundreds and three in the order of the thousands. These teeth 68 impart rotation to the pinions 96, 97, 98 and 99, 100 and 101 by an amount corresponding to the number of the respective circular pitches. Immediately after the action of the pins 64 on the driving teeth 68, the pins return into their initial position because the swinging lever 59 has again moved away from the drum 33.

As the pinions 96, 97, 98 act by means of the intermediate wheels 102, 103, 104 and 109, 111, 112 on the ten-, hundred- and thousand-wheels 123, 124, 125 and the pinions 99, 100, 101 act by means of the wheels 105, 106, 107 and 118, 117, 116 on the unit-, ten- and hundred-wheels 122, 123, 124 of the result mechanism, the first revolution of the bell 65 will cause $$375 + 375$$

to be brought into the result mechanism.

The same operation is repeated during the second revolution of the bell. At the beginning of the third revolution, however, the disk 145 which rotates by a little amount at each revolution of the bell, strikes by its cam member 143 against the upper bolt 85, Fig. 9, and moves the pinions 96, 97, 98 out of the operative plane of the driving teeth 68 through the intermediary of the curved member 88, lug 92 and shaft 94. During this revolution as well as during the following three revolutions, a transmission to the result mechanism is therefore only effected by the pinions 99, 100, 101.

At the beginning of the seventh revolution the lower bolt 85 will be engaged by the cam member 144 of disk 145 so that the transmission wheels 99, 100, 101 will then likewise be moved out of the operative range of the driving teeth 68. Therefore, the result mechanism is not acted upon at all during the last three revolutions. The product obtained in this result mechanism is thereupon transmitted to the two result indicating devices 13, 14 in the above-indicated manner during the rotation of the shaft 78 for the purpose of the zero-setting.

The sums indicated in the result indicating devices may be continuously transferred to an adding mechanism which may be read off at any desired intervals of time.

The rack bars 132, Fig. 16, are to this end extended downwardy and in engagement with pinions 163, 164, 165, 166 which are arranged for free rotation on a shaft 167 constructed as a zero-setting shaft. Pinions 168, 169 representing still two higher orders of the adding mechanism are arranged at the left-hand side of the pinion 163. For the transferring of the tens, there are arranged intermediate wheels 171 on a common rod 170, tens transfer levers 172 and a tens transfer drum 174 provided with tens transfer teeth 173 which are adapted to be rocked laterally. The drum 174 is fastened on the shaft 149 and takes part in the rotation of the same. As the shaft 149 makes only an oscillatory movement while the tens transfer drum 174 has to execute a continuous rotation, the shaft 149 has fastened on it a disk 192, Fig. 17, which carries a rotatable pawl 191 engaging a ratchet wheel 193 connected with the tens transfer drum 174.

Each time the rack bars 132 are brought into engagement with the intermediate wheels 112, 111, 109, 119 of the result mechanism prior to the zero-setting movement of shaft 78, they will also be thrown into engagement with the wheels 163, 164, 165, 166, Fig. 16, so that the several wheels have imparted to them the same rotation during the movement of the rack-bars 132. The sum accumulated in the adding mechanism may be indicated during the zero-setting of this mechanism by means of indicating segments 17 in an inspection hole 16. To this end, there is arranged beside each of the pinions 166, 165, 164, 163, 168, 169 a toothed segment 175, Fig. 16, which is connected with an indicating segment 17 by means of a double-armed lever 176 which is mounted for rotation on a shaft 177. The shaft 177 carrying all of the levers 176 is normally in the position into which it is brought by being rocked toward the left, so that the toothed segments 175 are prevented from meshing with the wheels of the adding mechanism. If, however, the value accumulated in the adding mechanism should be indicated, the shaft 167 has to be rotated by means of a key to be inserted in the key hole 19, Fig. 1. If this is done there will be first imparted a rotary movement to a disk 178 fastened on the shaft 167 and provided with a recess 179, whereby in turn a rocking motion is imparted to a single-armed lever 180 which is rigidly connected with a shaft 181 and placed under the action of a spring 182. A lever 183 connects the shaft 181 with shaft 177. The said rocking movements causes the shaft 177 together with the double-armed levers 176 carried by the same to be moved toward the right, so that the toothed segments 175 are brought into engagement with the wheels of the adding mechanism. When the adding mechanism is set to zero by rotating the shaft 167 carrying along with it the wheels 166, 165, 164, 163, 168, 169, the indicating segments 17 are brought into the corresponding positions of value. The numerals arranged on these segments 17 are visible through a hole 184 of a shutter 185 which is adapted to be rocked about a shaft 186 and connected by means of a link 187 with the shaft 177 of the indicating segments, so that the peep hole 184 is always closely in front of the segments 17. After the zero-setting of the adding mechanism has been terminated, the lever 180 is again drawn into the recess 179 of the disk 178 by its spring 182, whereby the toothed segments 175 are thrown out of engagement with the adding mechanism.

The zero-setting of the indicating segments 17 is performed by rotating a shaft 188 for which is provided the key-hole 18, Fig. 1. Connected with this shaft 188 by means of two single-armed levers 189 is a rod, 190 which, when swung upwards, strikes against the levers 176 and moves the indicating segments 17 into zero position.

The feel pawl 154 is provided with a pin 198, Figs. 13 and 14, which is adapted to lift the pawl 154 out of the ratchet wheel 155 through the action of a rotary member 199 to which rotation may be imparted by a hand lever 200 adapted to be moved by a key 73. If this has been done, the shaft 78 will not be rotated in the sense of the zero-setting of the result mechanism during the return rotation of the toothed wheel 153. Consequently, a plurality of successive results of the calculating mechanism is allowed to be summed up in the result mechanism, which results are for instance obtained by selling several merchandises to one purchaser. When calcualting the last selling-price the pawl 154 has to be thrown in again in order to allow of the value accumulated in the result mechanism to be transmitted by the rack-bars 132 to the result indicating mechanisms 13, 14 during the zero-setting operation following the throwing-in of the pawl.

The rack bars 132 are thrown into engagement with the result mechanism and the adding mechanism by swinging them toward these mechanisms when the nine revolutions of the bell 65 have been terminated. The rack-bars which are guided by means of slots 201 on a horizontal stationary guiding bolt 202, Fig. 16, are adapted to be swung as indicated by means of a rod 223 which is carried by two single-armed levers 204 and in engagement with longitudinal slots 203 of the rack-bars 132.

After a result of a calculation has been transferred to the result indicating mechanisms 13, 14 by lifting the rack-bars 132, the same are returned at the beginning of a new calculation into zero position by swinging the levers 204 back. The rack-bars then drop into their initial position.

At the beginning of the return rotation of the bell 65, a rod 205, Figs. 10 and 13, is shifted toward the left in such a manner that pins 206 fastened on it force the driving teeth 68, which are in operative position, back into initial position.

The bell 65 is secured in its exact position of rest by means of a spring-pressed locking bolt 207, Fig. 13, which is controlled by the drive of the calculating mechanism and arranged to extend through a bore 208 of the bell 65 into a recess 209 of a stationary disk 210.

The entire operation of the calculating mechanism of the new balance is carried out by three revolutions of a shaft 211 produced either by an electromotor or a hand crank 15. Fastened on this shaft 211 is a pinion 212 which meshes with a pinion 214 splined on a countershaft 213 and making each time only one single revolution. This countershaft 213 carries five cams 215, 216, 217, 218 and 219 which rotate with the shaft. The pinion 214 has pivoted to it a pitman 220 which is connected with the toothed segment 161 which is splined on the shaft 149 and executes an oscillatory movement of about 120 degrees and which drives the shaft 162 carrying the bell 65 by the intermediary of the pinions 160, 159 and 158.

For locking this gear in the initial and terminal position there may be used a locking pawl which engages a notch of a locking disk 221 fastened on shaft 213 and which may be disengaged by the seller depressing the key 12. This pawl, which automatically enters again into operative position upon the rotation of the main driving shaft 211 being terminated, may be connected in any suitable manner with the locking bolt 207 which likewise has to be thrown out at the beginning of the rotation of the bell 65 and thrown in again at the end of this rotation.

Figure 7:
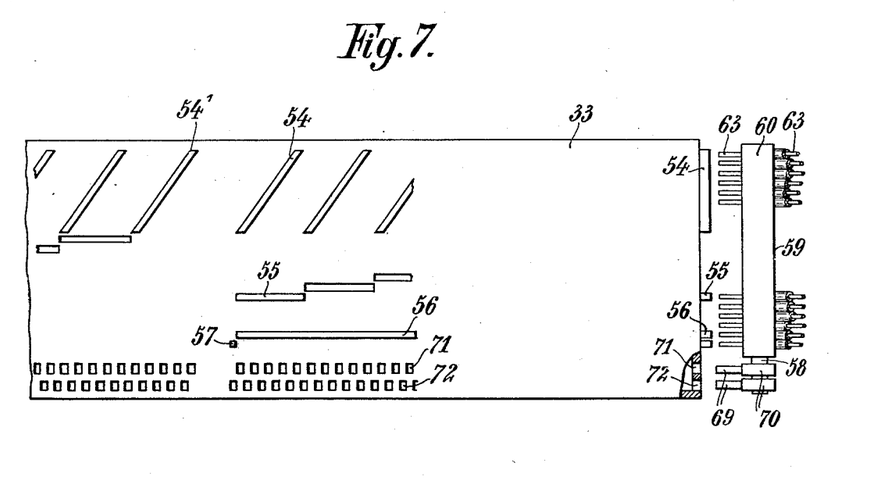
Fig. 7 is a part of the weight scale drum seen from above.
Figure 8:
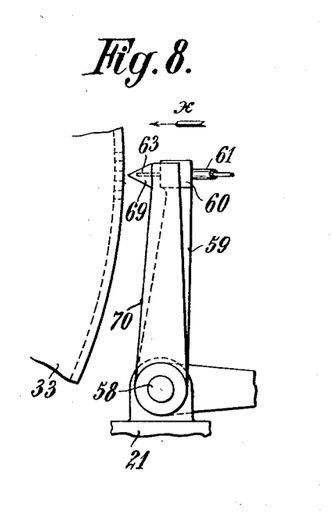
Fig. 8 is a part of the weight scale drum seen from the side.

The two cams 215 and 216 move the two feelers 70, Figs. 7 and 8, toward the scale drum 33 and then withdraw them again into initial position.

The cam 217 controls the bell-crank lever 59 by means of which the transmission wires 63 are pressed against the elevations of the scale drum and thereafter moved back again.

As soon as the return rotation of the bell 65 begins, the cam 218 moves the rod 205 for a short time toward the left so that it may return the driving teeth 68 into initial position.

The cam 219 controls the shaft 222 by means of which rocking motion is imparted to the rod 223 which throws the rack bars 132 into and out of engagement with the result mechanism and the adding mechanism.

Instead of the elevations (ledges, pins 54, 55, 56 or the like) there may be provided on the scale drum 33 depressions into which are introduced those transmission wires which should not effect a transmission, while the other wires are pushed back by the remaining shell surface of the scale drum.

While the form of mechanism herein shown and described is admirably adapted to fulfill the objects primarily stated, it is to be understood that it is not intended to confine the invention to the one form of embodiment herein shown and described, as it is susceptible of embodiment in various forms all coming within the scope of the claims which follow.

Claims:

1. An automatic balance comprising in combination a calculating machine for establishing the price of the matter weighed, a weight indicating device including a drum, determining units on this drum for bodily representing the weights, a transmitting device arranged between the said drum and the calculating machine, this transmitting device including flexible tubes, spring-pressed wires embedded for shifting motion in the flexible tubes and having their ends near the drum projecting out of the tubes, and means for moving these ends radially with relation to the axis of the drum.

2. An automatic balance comprising in combination a calculating machine for establishing the price of the matter weighed, a weight indicating device including a scale drum, determining units on this drum for bodily representing the weights, a transmitting device arranged between the said drum and the calculating machine, this transmitting device including flexible tubes, spring-pressed wires embedded for shifting motion in the flexible tubes, the ends of the wires adjacent the drum being arranged to project out of the flexible tubes, means for moving these ends radially with relation to the axis of the drum, and the ends of the wires remote from the drum being arranged for cooperation with adjustable driving teeth of the calculating mechanism.

3. An automatic balance comprising in combination a calculating machine for establishing the price of the matter weighed, a weight indicating device including a scale drum, determining units on this drum for bodily representing the weights, a transmitting device arranged between the said drum and the calculating machine, this transmitting device including flexible tubes, spring-pressed wires embedded for shifting motion in the flexible tubes, the ends of the wires adjacent the drum being arranged to project out of the flexible tubes and adapted to be operated upon by the said determining units of the drum, and the ends of the wires remote from the drum being arranged for cooperation with driving teeth of the calculating mechanism, these driving teeth being mounted for lateral shifting motion in a rotatable bell.

4. An automatic balance comprising in combination a calculating machine for establishing the price of the matter weighed, a weight indicating device including a scale drum, determining units on this drum for bodily representing the weights, a transmitting device arranged between the said drum and the calculating machine, the transmitting device including flexible tubes, spring-pressed wires embedded for shifting motion in the flexible tubes, the ends of the wires adjacent the drum being arranged to project out of the flexible tubes and adapted to be operated upon by the said determining units of the drum, and the ends of the wires remote from the drum being arranged for cooperation with driving teeth of the calculating mechanism, these driving teeth being mounted for lateral shifting motion in a rotatable bell, at least one result mechanism being arranged to extend into the interior of the said bell and to be actuated by the driving teeth taking part in the rotation of the bell.

5. An automatic balance comprising in combination a calculating machine for establishing the price of the matter weighed, a weight indicating device including a scale drum, determining units on this drum for bodily representing the weights, a transmitting device between the drum and the calculating machine, this transmitting device including longitudinally shiftable wires the one ends of which are adapted to be operated upon by the said determining units of the drum and the other ends of which are arranged for cooperation with driving teeth of the calculating mechanism, these teeth being mounted for lateral shifting motion in a rotatable bell, a result mechanism extending into the interior of the bell and adapted to be actuated by the driving teeth, means for disengaging the result mechanism, and setting levers for controlling the disengageable result mechanism and setting the price of the matter weighed in the calculating mechanism.

6. An automatic balance comprising in combination a calculating machine for establishing the price of the matter weighed, a weight indicating device including a scale drum, determining units on this drum for bodly representing the weights, a transmitting device between the drum and the calculating machine, this transmitting device including longitudinally shiftable wires the one ends of which are adapted to be operated upon by the said determining units of the drum and the other ends of which are arranged for cooperation with driving teeth of the calculating mechanism, these teeth being mounted for lateral shifting motion in a rotatable bell, a result mechanism extending into the interior of the bell and adapted to be actuated by the driving teeth, means for disengaging the result mechanism, setting levers for controlling the disengageable result mechanism and setting the price of the matter weighed in the calculating mechanism, an axially shiftable bolt carried by the setting levers, a cam adapted to be rotated for a certain amount during each revolution of the bell and to shift the said bolt laterally upon the set value being exceeded.

7. An automatic balance comprising in combination a calculating machine for establishing the price of the matter weighed, a weight indicating device including a scale drum, determining units on this drum for bodily representing the weights, a transmitting device between the drum and the calculating machine, this transmitting device including longitudinally shiftable wires the one ends of which are adapted to be operated upon by the said determining units of the drum and the other ends of which are arranged for cooperation with driving teeth of the calculating mechanism, these teeth being mounted for lateral shifting motion in a rotatable bell, an axially shiftable result mechanism extending into the interior of the bell and adapted to be actuated by the said driving teeth, setting levers for controlling the result mechanism and setting the price of the matter weighed in the calculating mechanism, an axially shiftable bolt carried by the setting levers, a cam for shifting the bolt laterally, and a rockable curved member for transmitting the shifting movement of the said bolt to the axially shiftable result mechanism and moving the latter out of the operative plane of the adjustable driving teeth.

8. An automatic balance comprising in combination a calculating machine for establishing the price of the matter weighed, a weight indicating device including a scale drum, determining units on this drum for bodily representing the weights, a transmitting device between the drum and the calculating machine, this transmitting device including longitudinally shiftable wires the one ends of which are adapted to be operated upon by the said determining units of the drum and the other ends of which are arranged for cooperation with driving teeth of the calculating mechanism, these teeth being mounted for lateral shifting motion in a rotatable bell, a result mechanism extending into the interior of the bell and adapted to be actuated by the driving teeth, means for disengaging the result mechanism, setting levers for controlling the disengageable result mechanism and setting the price of the matter weiged in the calculating mechanism, an axially shiftable bolt carried by the setting levers, a cam adapted to shift the said bolt laterally upon the set value being exceeded, a common driving gear connecting the said bell and the cam in such a manner that the bell always executes nine full revolutions while the cam has imparted to it in the same time nine short stepwise partial rotations in the same direction.

9. An automatic balance comprising in combination a calculating machine for establishing the price of the matter weighed, a weight indicating device including a scale drum, determining units on this drum for bodily representing the weights, a transmitting device arranged between the said drum and the calculating machine, this transmitting device including flexible tubes, spring-pressed wires embedded for shifting motion in the flexible tubes, the ends of the wires adjacent the drum being arranged to project out of the flexible tubes and adapted to be operated upon by the said determining units of the drum, and the ends of the wires remote from the drum being arranged for cooperation with driving teeth of the calculating mechanism, these driving teeth being mounted for lateral shifting motion in a rotatable bell, a result mechanism being arranged to extend into the interior of the said bell and adapted to be acted upon by the driving teeth, a zero setting shaft carrying the result mechanism, two result-indicating mechanisms, rack-bars for transmitting the value accumulated in the result mechanism by the aid of the zero-setting shaft to the result indicating mechanisms, and a gear for driving the zero-setting shaft consisting of a feed wheel and a revolving and manually releasable pawl engaging the feed wheel.

10. An automatic balance comprising in combination a calculating machine for establishing the price of the matter weighed, a weight indicating device including a scale drum, determining units on this drum for bodily representing the weights, a transmitting device arranged between the said drum and the calculating machine, this transmitting device including flexible tubes, spring-pressed wires embedded for shifting motion in the flexible tubes, the ends of the wires adjacent the drum being arranged to project out of the flexible tubes and adapted to be operated upon by the said determining units of the drum, and the ends of the wires remote from the drum being arranged for cooperation with driving teeth of the calculating mechanism, these driving teeth being mounted for lateral shifting motion in a rotatable bell, a result mechanism being arranged to extend into the interior of the said bell and adapted to be acted upon by the driving teeth, a zero-setting shaft carrying the result mechanism, two result-indicating mechanisms, rack-bars for transmitting the value accumulated in the result mechanism by the aid of the zero-setting shaft to the result-indicating mechanisms, these mechanisms being arranged so as to display the result in a visible manner both to the seller and the purchaser.

11. An automatic balance comprising in combination a calculating machine for establishing the price of the matter weighed, a weight indicating device including a scale drum, determining units on this drum for bodily representing the weights, a transmitting device arranged between the said drum and the calculating machine, this transmitting device including flexible tubes, spring-pressed wires embedded for shifting motion in the flexible tubes, the ends of the wires adjacent the drum being arranged to project out of the flexible tubes and adapted to be operated upon by the said determining units of the drum, and the ends of the wires remote from the drum being arranged for cooperation with driving teeth of the calculating mechanism, these driving teeth being mounted for lateral shifting motion in a rotatable bell, a result mechanism being arranged to extend into the interior of the said bell and adapted to be acted upon by the driving teeth, a zero-setting shaft carrying the result mechanism, two result-indicating mechanisms, rack-bars for transmitting the value accumulated in the result mechanism by the aid of the zero-setting shaft to the result-indicating mechanisms, an adding mechanism adapted to be actuated by the said rack-bars when same perform the transferring operation from the result mechanism to the two result-indicating mechanisms, and another indicating mechanism adapted to be thrown into operation and to display the sum of the adding mechanism during the zero-setting.

In testimony whereof the foregoing specification is signed at Cologne, this 23d day of July, 1925.

JOHANNES FISCHER.